United States Patent
Wang et al.

(10) Patent No.: US 10,432,371 B2
(45) Date of Patent: Oct. 1, 2019

(54) DATA TRANSMISSION METHOD, USER EQUIPMENT, AND BASE STATION

(71) Applicant: HUAWEI TECHNOLOGIES CO., LTD., Shenzhen, Guangdong (CN)

(72) Inventors: Jianguo Wang, Bonn (DE); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 15/403,272

(22) Filed: Jan. 11, 2017

(65) Prior Publication Data

US 2017/0126376 A1    May 4, 2017

Related U.S. Application Data

(63) Continuation of application No. PCT/CN2014/082010, filed on Jul. 11, 2014.

(51) Int. Cl.
*H04L 5/00* (2006.01)
*H04W 72/04* (2009.01)
(Continued)

(52) U.S. Cl.
CPC ......... *H04L 5/0044* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS

| | | |
|---|---|---|
| 2008/0013610 A1 | 1/2008 | Varadarajan et al. |
| 2010/0002790 A1 | 1/2010 | Onggosanusi et al. |

(Continued)

FOREIGN PATENT DOCUMENTS

| | | |
|---|---|---|
| CN | 101754463 | 6/2010 |
| CN | 101834642 A | 9/2010 |

(Continued)

OTHER PUBLICATIONS

International Search Report dated Apr. 15, 2015 in corresponding International Application No. PCT/CN2014/082010.

(Continued)

*Primary Examiner* — Candal Elpenord
(74) *Attorney, Agent, or Firm* — Staas & Halsey LLP

(57) ABSTRACT

Embodiments of the present invention disclose a data transmission method, user equipment, and a base station. The method include: receiving a first reference signal set; obtaining, based on the first reference signal set and a first codeword-to-layer mapping, CSI that includes a rank indicator RI and a channel quality indicator CQI, and sending the CSI; receiving a second reference signal set; and receiving, based on the second reference signal set and a second codeword-to-layer mapping, data, where a quantity of layers to which at least one codeword is mapped in the first codeword-to-layer mapping is less than a quantity of layers to which a codeword is mapped in the second codeword-to-layer mapping. According to the embodiments of the present invention, precision of an MCS used during data transmission may be improved, and a throughput of a communications system may be enhanced.

12 Claims, 5 Drawing Sheets

(51) Int. Cl.
*H04W 88/02* (2009.01)
*H04B 7/0417* (2017.01)
*H04B 7/0452* (2017.01)

(52) U.S. Cl.
CPC ........... *H04L 5/006* (2013.01); *H04W 72/042* (2013.01); *H04W 88/02* (2013.01)

(56) References Cited

U.S. PATENT DOCUMENTS

| | | | |
|---|---|---|---|
| 2011/0170623 A1 | 7/2011 | Park et al. | |
| 2012/0051245 A1* | 3/2012 | Nam | H04L 1/1671 370/252 |
| 2013/0039349 A1* | 2/2013 | Ebrahimi Tazeh Mahalleh | H04L 1/0013 370/336 |
| 2013/0083681 A1* | 4/2013 | Ebrahimi Tazeh Mahalleh | H04L 5/0057 370/252 |
| 2014/0010321 A1* | 1/2014 | Kang | H04B 7/0634 375/267 |
| 2014/0233469 A1* | 8/2014 | Seo | H04L 5/001 370/329 |
| 2015/0256280 A1* | 9/2015 | Park | H04J 11/005 370/329 |
| 2016/0006553 A1* | 1/2016 | Kim | H04L 1/1671 370/252 |

FOREIGN PATENT DOCUMENTS

| | | |
|---|---|---|
| CN | 101938339 | 1/2011 |
| CN | 102769485 | 11/2012 |
| CN | 103701511 A | 4/2014 |
| WO | 2011/082589 A1 | 7/2011 |
| WO | WO2013023290 | 2/2013 |

OTHER PUBLICATIONS

Chinese Office Action dated May 9, 2018, in corresponding Chinese Patent Application No. 201480036839.9, 5 pgs.
International Search Report, dated Apr. 14, 2015, in International Application No. PCT/CN2014/082010 (4 pp.).
Extended European Search Report, dated Jun. 16, 2017, in European Application No. 14897351.4 (9 pp.).
*Way forward on scenarios for 3D channel modeling*, 3GPP TSG RAN WG1 Meeting #72bis, R1-131756, Chicago, USA, Apr. 15-19, 2013 (2 pp.).
*WF on antenna model in 3D channel modeling*, 3GPP TSG RAN WG1 #72bis, R1-131761, Chicago, USA, Apr. 15-19, 2013 (7 pp.).
*Way Forward on MU-CQI*, 3GPP TSG RAN WG1 #73, R1-132733, Fukuoka, Japan May 20-24, 2013 (2 pp.).
*WF on MU-CSI*, TSG-RAN WG1 Meeting #73, R1-132737, Fukuoka, Japan, May 20-24, 2013 (2 pp.).
Korean Office Action dated Sep. 4, 2018 from Korea Patent Application No. 10-2017-7003524 (7 pages).

* cited by examiner

DATA TRANSMISSION METHOD, USER EQUIPMENT, AND BASE STATION

CROSS-REFERENCE TO RELATED APPLICATIONS

This application is a continuation of International Application No. PCT/CN2014/082010, filed on Jul. 11, 2014, the disclosure of which is hereby incorporated by reference in its entirety.

TECHNICAL FIELD

The present invention relates to the communications field, and in particular, to a data transmission method, user equipment, and a base station.

BACKGROUND

A multi-antenna technology is widely used in a current communications system, so as to enhance a system capacity or improve user experience. For example, a 3rd Generation Partnership Project (3GPP) Long Term Evolution (LTE) R8 system may support four antenna ports, and an LTE R10 system may support eight antenna ports. However, an existing LTE R10 system supports sending of a maximum of two transport blocks (TB), and each TB on which channel coding has been performed is referred to as a codeword (CW). Therefore, in the current system, a maximum of two CWs need to be mapped to a maximum of four layers or a maximum of eight layers. In addition, the existing system feeds back a channel quality indicator (CQI) for each CW. The CQI may be used to indicate a corresponding modulation and coding scheme (MCS) when a block error rate of a TB corresponding to the CW is not less than a specified threshold (for example, 10%) when the TB is transmitted by using a data channel. The MCS indicated by the CQI has an equivalent signal to interference plus noise ratio (SINR) interval, that is, it may be understood that each CQI corresponds to one SINR interval.

The existing system supports a maximum of two CWs and feeds back only one CQI for each CW, and a maximum of four or eight layers may be used during channel transmission. Therefore, each CQI needs to reflect channel quality of multiple layers. Data transmission is scheduled by a base station according to a CQI fed back by user equipment. Therefore, when the CQI reflects more layers, accuracy of scheduling becomes lower, and consequently, precision of an MCS used during data transmission is lower; and less user equipment is paired during implementation of multi-user multiple-input multiple-output (MU-MIMO) transmission, and consequently, a throughput of a communications system is lower.

SUMMARY

Embodiments of the present invention provide a data transmission method, user equipment, and a base station, so that precision of an MCS used during data transmission may be improved, and a throughput of a communications system may be enhanced.

According to a first aspect, an embodiment of the present invention provides a data transmission method, including:

receiving, by user equipment, a first reference signal set sent by a base station;

obtaining, by the user equipment based on the first reference signal set and a first codeword-to-layer mapping, channel state information CSI that includes a rank indicator RI and a channel quality indicator CQI, and sending the CSI to the base station, where the first codeword-to-layer mapping includes a first mapping between at least one codeword and at least one transport layer, and the transport layer is a transport layer between the base station and the user equipment;

receiving, by the user equipment, a second reference signal set sent by the base station; and receiving, by the user equipment based on the second reference signal set and a second codeword-to-layer mapping, data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

In a first possible implementation manner of the first aspect, the first codeword-to-layer mapping includes at least one of the following:

mappings between three codewords and three layers, where one codeword is allowed to be mapped to only one layer; or mappings between four codewords and four layers, where one codeword is allowed to be mapped to only one layer.

With reference to the first possible implementation manner of the first aspect, in a second possible implementation manner of the first aspect, the first codeword-to-layer mapping includes at least the following mappings:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$<br>$x^{(1)}(i) = d^{(1)}(i)$<br>$x^{(2)}(i) = d^{(2)}(i)$ | $M_{symb}^{layer} = M_{symb}^{(0)} =$<br>$M_{symb}^{(1)} = M_{symb}^{(2)}$ |
| 4 | 4 | $x^{(0)}(i) = d^{(0)}(i)$<br>$x^{(1)}(i) = d^{(1)}(i)$<br>$x^{(2)}(i) = d^{(2)}(i)$<br>$x^{(3)}(i) = d^{(3)}(i)$ | $M_{symb}^{layer} = M_{symb}^{(0)} =$<br>$M_{symb}^{(1)} = M_{symb}^{(2)} =$<br>$M_{symb}^{(3)}$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

With reference to any one of the foregoing implementation manners of the first aspect, in a third possible implementation manner of the first aspect, the first codeword-to-layer mapping or the second codeword-to-layer mapping is configured by the base station by using signaling.

According to a second aspect, an embodiment of the present invention provides a data transmission method, including:

sending, by a base station, a first reference signal set to user equipment;

receiving, by the base station, channel state information CSI that includes a rank indicator RI and a channel quality indicator CQI and that is sent by the user equipment, where the CSI is obtained by the user equipment based on the first reference signal set and a first codeword-to-layer mapping, the first codeword-to-layer mapping includes a first mapping between at least one codeword and at least one transport layer, and the transport layer is a transport layer between the base station and the user equipment;

sending, by the base station, a second reference signal set to the user equipment; and sending, by the base station, data to the user equipment based on a second codeword-to-layer mapping, so that the user equipment receives, based on the second reference signal set and the second codeword-to-layer mapping, the data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

In a first possible implementation manner of the second aspect, the first codeword-to-layer mapping includes at least one of the following:

mappings between three codewords and three layers, where one codeword is allowed to be mapped to only one layer; or mappings between four codewords and four layers, where one codeword is allowed to be mapped to only one layer.

With reference to the first possible implementation manner of the second aspect, in a second possible implementation manner of the second aspect, the first codeword-to-layer mapping includes at least the following mappings:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$  $M_{symb}^{layer} = M_{symb}^{(0)} =$<br>$x^{(1)}(i) = d^{(1)}(i)$  $M_{symb}^{(1)} = M_{symb}^{(2)}$<br>$x^{(2)}(i) = d^{(2)}(i)$ |
| 4 | 4 | $x^{(0)}(i) = d^{(0)}(i)$  $M_{symb}^{layer} = M_{symb}^{(0)} =$<br>$x^{(1)}(i) = d^{(1)}(i)$  $M_{symb}^{(1)} = M_{symb}^{(2)} = M_{symb}^{(3)}$<br>$x^{(2)}(i) = d^{(2)}(i)$<br>$x^{(3)}(i) = d^{(3)}(i)$ | where $N_{layer}$ indicates a quantity of layers, $N_{CW}$ indicates a quantity of codewords, $x^{(0)}(i)$、$x^{(1)}(i)$、$x^{(2)}(i)$、$x^{(3)}(i)$ are respectively symbols transmitted on the layers, $d^{(0)}(i)$、$d^{(1)}(i)$、$d^{(2)}(i)$、$d^{(3)}(i)$ are respectively symbols included in the codewords, and $M_{symb}^{(0)}$、$M_{symb}^{(1)}$、$M_{symb}^{(2)}$、$M_{symb}^{(3)}$ are respectively quantities of symbols transmitted on the layers.

With reference to any one of the foregoing implementation manners of the second aspect, in a third possible implementation manner of the second aspect, the first codeword-to-layer mapping or the second codeword-to-layer mapping is configured for the user equipment by using signaling.

According to a third aspect, the present invention provides user equipment, including a receiving unit and a sending unit, where the receiving unit is configured to receive a first reference signal set sent by a base station;

the sending unit is configured to obtain, based on the first reference signal set and a first codeword-to-layer mapping, channel state information CSI that includes a rank indicator RI and a channel quality indicator CQI, and send the CSI to the base station, where the first codeword-to-layer mapping includes a first mapping between at least one codeword and at least one transport layer, and the transport layer is a transport layer between the base station and the user equipment;

the receiving unit is further configured to receive a second reference signal set sent by the base station; and the receiving unit is further configured to receive, based on the second reference signal set and a second codeword-to-layer mapping, data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

In a first possible implementation manner of the third aspect, the first codeword-to-layer mapping includes at least one of the following:

mappings between three codewords and three layers, where one codeword is allowed to be mapped to only one layer; or mappings between four codewords and four layers, where one codeword is allowed to be mapped to only one layer.

With reference to the first possible implementation manner of the third aspect, in a second possible implementation manner of the third aspect, the first codeword-to-layer mapping includes at least the following mappings:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$  $M_{symb}^{layer} = M_{symb}^{(0)} =$<br>$x^{(1)}(i) = d^{(1)}(i)$  $M_{symb}^{(1)} = M_{symb}^{(2)}$<br>$x^{(2)}(i) = d^{(2)}(i)$ |
| 4 | 4 | $x^{(0)}(i) = d^{(0)}(i)$  $M_{symb}^{layer} = M_{symb}^{(0)} =$<br>$x^{(1)}(i) = d^{(1)}(i)$  $M_{symb}^{(1)} = M_{symb}^{(2)} = M_{symb}^{(3)}$<br>$x^{(2)}(i) = d^{(2)}(i)$<br>$x^{(3)}(i) = d^{(3)}(i)$ | where $N_{layer}$ indicates a quantity of layers, $N_{CW}$ indicates a quantity of codewords, $x^{(0)}(i)$、$x^{(1)}(i)$、$x^{(2)}(i)$、$x^{(3)}(i)$ are respectively symbols transmitted on the layers, $d^{(0)}(i)$、$d^{(1)}(i)$、$d^{(2)}(i)$、$d^{(3)}(i)$ are respectively symbols included in the codewords, and $M_{symb}^{(0)}$、$M_{symb}^{(1)}$、$M_{symb}^{(2)}$、$M_{symb}^{(3)}$ are respectively quantities of symbols transmitted on the layers.

With reference to any one of the foregoing implementation manners of the third aspect, in a third possible implementation manner of the third aspect, the first codeword-to-layer mapping or the second codeword-to-layer mapping is configured by the base station by using signaling.

According to a fourth aspect, the present invention provides a base station, including a sending unit and a receiving unit, where the sending unit is configured to send a first reference signal set to user equipment;

the receiving unit is configured to receive channel state information CSI that includes a rank indicator RI and a channel quality indicator CQI and that is sent by the user equipment, where the CSI is obtained by the user equipment based on the first reference signal set and a first codeword-to-layer mapping, the first codeword-to-layer mapping includes a first mapping between at least one codeword and at least one transport layer, and the transport layer is a transport layer between the base station and the user equipment;

the sending unit is further configured to send a second reference signal set to the user equipment; and the sending unit is further configured to send data to the user equipment based on a second codeword-to-layer mapping, so that the user equipment receives, based on the second reference signal set and the second codeword-to-layer mapping, the data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

In a first possible implementation manner of the fourth aspect, the first codeword-to-layer mapping includes at least one of the following:

mappings between three codewords and three layers, where one codeword is allowed to be mapped to only one layer; or mappings between four codewords and four layers, where one codeword is allowed to be mapped to only one layer.

With reference to the first possible implementation manner of the fourth aspect, in a second possible implementation manner of the fourth aspect, the first codeword-to-layer mapping includes at least the following mappings:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$   $M_{symb}^{layer} = M_{symb}^{(0)} =$<br>$x^{(1)}(i) = d^{(1)}(i)$   $M_{symb}^{(1)} = M_{symb}^{(2)}$<br>$x^{(2)}(i) = d^{(2)}(i)$ |
| 4 | 4 | $x^{(0)}(i) = d^{(0)}(i)$   $M_{symb}^{layer} = M_{symb}^{(0)} =$<br>$x^{(1)}(i) = d^{(1)}(i)$   $M_{symb}^{(1)} = M_{symb}^{(2)} = M_{symb}^{(3)}$<br>$x^{(2)}(i) = d^{(2)}(i)$<br>$x^{(3)}(i) = d^{(3)}(i)$ | where $N_{layer}$ indicates a quantity of layers, $N_{CW}$ indicates a quantity of codewords, $x^{(0)}(i)$、$x^{(1)}(i)$、$x^{(2)}(i)$、$x^{(3)}(i)$ are respectively symbols transmitted on the layers, $d^{(0)}(i)$、$d^{(1)}(i)$、$d^{(2)}(i)$、$d^{(3)}(i)$ are respectively symbols included in the codewords, and $M_{symb}^{(0)}$、$M_{symb}^{(1)}$、$M_{symb}^{(2)}$、$M_{symb}^{(3)}$ are respectively quantities of symbols transmitted on the layers.

With reference to any one of the foregoing implementation manners of the fourth aspect, in a third possible implementation manner of the fourth aspect, the base station further includes:

a configuring unit, configured to configure the first codeword-to-layer mapping or the second codeword-to-layer mapping for the user equipment by using signaling.

According to a fifth aspect, the present invention provides user equipment, including a receiver, a processor, and a transmitter, where the receiver is configured to receive a first reference signal set sent by a base station;

the processor is configured to obtain, based on the first reference signal set and a first codeword-to-layer mapping, channel state information CSI that includes a rank indicator RI and a channel quality indicator CQI, where the first codeword-to-layer mapping includes a first mapping between at least one codeword and at least one transport layer, and the transport layer is a transport layer between the base station and the user equipment;

the transmitter is configured to send the CSI to the base station;

the receiver is further configured to receive a second reference signal set sent by the base station; and the receiver is further configured to receive, based on the second reference signal set and a second codeword-to-layer mapping, data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

In a first possible implementation manner of the fifth aspect, the first codeword-to-layer mapping includes at least one of the following:

mappings between three codewords and three layers, where one codeword is allowed to be mapped to only one layer; or mappings between four codewords and four layers, where one codeword is allowed to be mapped to only one layer.

With reference to the first possible implementation manner of the fifth aspect, in a second possible implementation manner of the fifth aspect, the first codeword-to-layer mapping includes at least the following mappings:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$   $M_{symb}^{layer} = M_{symb}^{(0)} =$<br>$x^{(1)}(i) = d^{(1)}(i)$   $M_{symb}^{(1)} = M_{symb}^{(2)}$<br>$x^{(2)}(i) = d^{(2)}(i)$ |
| 4 | 4 | $x^{(0)}(i) = d^{(0)}(i)$   $M_{symb}^{layer} = M_{symb}^{(0)} =$<br>$x^{(1)}(i) = d^{(1)}(i)$   $M_{symb}^{(1)} = M_{symb}^{(2)} = M_{symb}^{(3)}$<br>$x^{(2)}(i) = d^{(2)}(i)$<br>$x^{(3)}(i) = d^{(3)}(i)$ | where $N_{layer}$ indicates a quantity of layers, $N_{CW}$ indicates a quantity of codewords, $x^{(0)}(i)$、$x^{(1)}(i)$、$x^{(2)}(i)$、$x^{(3)}(i)$ are respectively symbols transmitted on the layers, $d^{(0)}(i)$、$d^{(1)}(i)$、$d^{(2)}(i)$、$d^{(3)}(i)$ are respectively symbols included in the codewords, and $M_{symb}^{(0)}$、$M_{symb}^{(1)}$、$M_{symb}^{(2)}$、$M_{symb}^{(3)}$ are respectively quantities of symbols transmitted on the layers.

With reference to any one of the foregoing implementation manners of the fifth aspect, in a third possible implementation manner of the fifth aspect, the first codeword-to-layer mapping or the second codeword-to-layer mapping is configured by the base station by using signaling.

According to a sixth aspect, the present invention provides a base station, including a transmitter and a receiver, where the transmitter is configured to send a first reference signal set to user equipment;

the receiver is configured to receive channel state information CSI that includes a rank indicator RI and a channel quality indicator CQI and that is sent by the user equipment, where the CSI is obtained by the user equipment based on the first reference signal set and a first codeword-to-layer mapping, the first codeword-to-layer mapping includes a first mapping between at least one codeword and at least one transport layer, and the transport layer is a transport layer between the base station and the user equipment;

the transmitter is further configured to send a second reference signal set to the user equipment; and the transmitter is further configured to send data to the user equipment based on a second codeword-to-layer mapping, and send the data to the user equipment, so that the user equipment receives, based on the second reference signal set and the second codeword-to-layer mapping, the data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

In a first possible implementation manner of the sixth aspect, the first codeword-to-layer mapping includes at least one of the following:

mappings between three codewords and three layers, where one codeword is allowed to be mapped to only one layer; or mappings between four codewords and four layers, where one codeword is allowed to be mapped to only one layer.

With reference to the first possible implementation manner of the sixth aspect, in a second possible implementation manner of the sixth aspect, the first codeword-to-layer mapping includes at least the following mappings:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$  $M_{symb}^{layer} = M_{symb}^{(0)} =$ |
|   |   | $x^{(1)}(i) = d^{(1)}(i)$  $M_{symb}^{(1)} = M_{symb}^{(2)}$ |
|   |   | $x^{(2)}(i) = d^{(2)}(i)$ |
| 4 | 4 | $x^{(0)}(i) = d^{(0)}(i)$  $M_{symb}^{layer} = M_{symb}^{(0)} =$ |
|   |   | $x^{(1)}(i) = d^{(1)}(i)$  $M_{symb}^{(1)} = M_{symb}^{(2)} = M_{symb}^{(3)}$ |
|   |   | $x^{(2)}(i) = d^{(2)}(i)$ |
|   |   | $x^{(3)}(i) = d^{(3)}(i)$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

With reference to any one of the foregoing implementation manners of the sixth aspect, in a third possible implementation manner of the sixth aspect, the transmitter is further configured to configure the first codeword-to-layer mapping or the second codeword-to-layer mapping for the user equipment by using signaling.

In the foregoing technical solutions, user equipment receives a first reference signal set sent by a base station, the user equipment obtains, based on the first reference signal set and a first codeword-to-layer mapping, CSI that includes an RI and a CQI, and sends the CSI to the base station. When receiving data sent by the base station, the user equipment receives the data based on a second reference signal set and a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling is improved, and in particular, precision of an MCS determined during data transmission is improved; and during implementation of MU-MIMO transmission, accuracy of CQI adjustment may be improved, and a quantity of paired user equipment may be increased, thereby enhancing a system throughput.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A method, user equipment, and base station described in the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, and a Long Term Evolution (LTE) system.

In addition, user equipment (UE) may also be referred to as a mobile terminal, mobile user equipment, and the like. The user equipment may communicate with one or more core networks by using a radio access network (for example, RAN). The user equipment may be a mobile terminal, such as a mobile phone (or referred to as a "cellular" phone), or a computer having a mobile terminal; for example, the user equipment may be a portable, pocket-sized, handheld, computer built-in, or in-vehicle mobile apparatus. The user equipment may also be a relay, which exchanges voice and/or data with the radio access network.

Moreover, the base station may be a base station (BTS) in the GSM or CDMA, may be a base station (NodeB) in the WCDMA, or may be an evolved NodeB (eNB or e-NodeB) or a relay in the LTE, which is not limited in the embodiments of the present invention.

Figure 1:
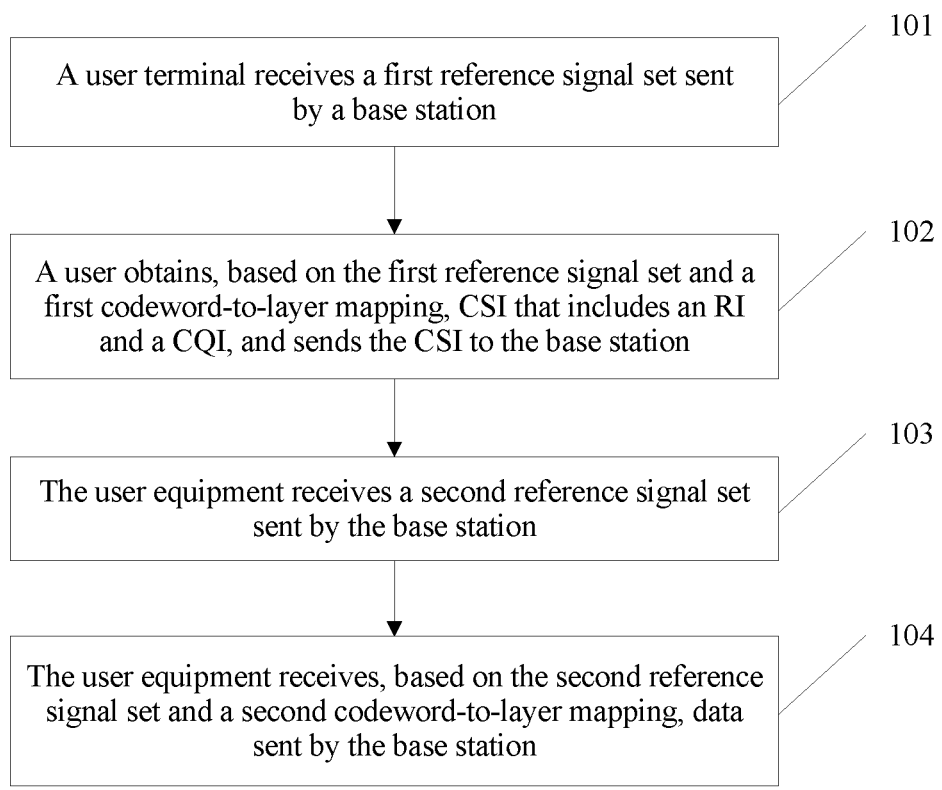
FIG. 1 is a schematic flowchart of a data transmission method according to an embodiment of the present invention.

Referring to FIG. 1, FIG. 1 is a schematic flowchart of a data transmission method according to an embodiment of the present invention. As shown in FIG. 1, the method includes the following steps.

101. A user terminal receives a first reference signal set sent by a base station.

Optionally, a reference signal in the foregoing first reference signal set may be a cell-specific reference signal (CRS), or a reference signal in the foregoing first reference signal set may be a channel state information reference signal (CSI RS), for example, a CRS in an LTE R8 system or a CSI RS in an LTE R8 system. In addition, the foregoing first reference signal set may include one or more reference signals.

102. A user equipment obtains, based on the first reference signal set and a first codeword-to-layer mapping, CSI that includes an RI and a CQI, and sends the CSI to the base station, where the first codeword-to-layer mapping includes a first mapping between at least one codeword and at least one transport layer, and the transport layer is a transport layer between the base station and the user equipment.

Optionally, step 102 may include:

obtaining a channel estimation based on the first reference signal set; and obtaining, according to the channel estimation, the CSI that includes the RI and the CQI, and sending the CSI to the base station, where the CQI is obtained based on the foregoing first codeword-to-layer mapping.

Further, the CSI may further include a precoding matrix indicator precoding matrix indicator, PMI).

Optionally, for a step of obtaining the RI and the CSI, refer to the following steps:

(A) Obtain a channel estimation based on the first reference signal set.

(B) Obtain, by means of selection, an optimal rank r* of the user equipment according to a system equation and the channel estimation, where the optimal rank r* may be the foregoing RI.

(C) According to the foregoing rank r*, a quantity of transport layers used to transmit data may be obtained, and an SINR of a symbol transmitted on each layer of each resource element may be obtained, that is, an SINR of each symbol of each resource element may be obtained.

(D) An SINR of each symbol of each codeword may be obtained according to the first codeword-to-layer mapping relationship.

(E) Map SINRs of all symbols in a codeword to an equivalent SNR. In this way, one codeword may obtain one equivalent SNR, that is, an ESNR, and an ESNR corresponding to each codeword may be referred to as an SNR of the codeword. An SNR may be quantized to a CQI. Therefore, a CQI of the codeword may be obtained, so that the foregoing CSI can be generated.

For specific description and examples of the foregoing steps, refer to the following description. In addition, a symbol transmitted on each layer may be understood as a symbol transmitted on each layer in a process in which the base station sends a signal to the user equipment. For example, a signal sent by the base station is: $x(i)=[x^{(0)}(i) \ x^{(1)}(i) \ldots x^{(r-1)}(i)]^T$, where r indicates a quantity of used layers, and $x^{(0)}(i), x^{(1)}(i) \ldots x^{(r-1)}(i)$ respectively indicate symbols transmitted on a first layer, a second layer, and an $r^{th}$ layer. In addition, one codeword may include multiple symbols, and the multiple symbols included in the codeword may be transmitted on different layers. For details, refer to the first codeword-to-layer mapping and a second codeword-to-layer mapping that are provided in this embodiment.

The foregoing channel estimation may be a channel estimation on a resource element (RE) used by the foregoing first reference signal set. For example, a channel estimation value may be obtained based on the first reference signal set by using a least square (LS) method or a minimum mean square error (MMSE) criterion. Generally, a channel estimation value on an RE used by a reference signal may be directly obtained by using the LS method, and a channel estimation value on each RE in one or more resource blocks (RB) may be obtained by means of interpolation or extrapolation by using the MMSE method.

The following uses an REi (that is, an RE whose serial number is i) as an example for description. A channel estimation value on the REi may be indicated as H(i), and based on the channel estimation, an equation of an MIMO system using beamforming or precoding may be indicated as:

$$y(i)=H(i)W(i)x(i)+n(i), i=0,1,\ldots,N_{RE}-1;$$

where H(i) is an $N_R \times N_T$ matrix, $N_R$ is a quantity of receive antennas of the user equipment, and $N_T$ is a quantity of transmit antennas of the base station; y(i) is a received signal vector of $N_R$ dimensions of the user equipment on the REi, and W(i) is an $N_T \times r$ precoding matrix used on the REi, where r is a rank of the precoding matrix; x(i) is a symbol vector of r dimensions that is sent by the base station, and n(i) is measured noise of $N_R$ dimensions, where the measured noise may include thermal noise of a receiver and intra-cell or inter-cell interference; and $N_{RE}$ is a quantity of used resource elements.

Optionally, the foregoing precoding matrix W(i) may be selected from a codebook C. The codebook C may be configured in the user equipment and the base station, and known by both parties. The base station may limit, by using higher layer signaling such as RRC signaling, a codebook subset that may be used or selected by the user equipment.

Optionally, the foregoing precoding matrix W(i) may be predefined, and known by both the user equipment and the base station. Specifically, the precoding matrix W(i) selected by the user equipment may be determined according to a used resource element, an antenna port, or a rank r. For example, the precoding matrix W(i) is selected according to the following formula:

$$W(i) = P_k^{(r)}, \text{ where}$$

$$k = \left(\left\lfloor \frac{i}{r} \right\rfloor \mod N_{C^{(r)}}\right) + 1 \in \{1, 2, \ldots, N_{C^{(r)}}\};$$

where $C^{(r)}$ indicates a codebook or codebook subset of a rank r, and is formed by a precoding matrix of the rank r; k is an indicator or index of a precoding matrix in a used codebook or codebook subset; $P_k^{(r)}$ is a precoding matrix, in the codebook or codebook subset $C^{(r)}$, that is corresponding to the index or indicator k; $N_{C^{(r)}}$ is a size of the codebook or codebook subset $C^{(r)}$, that is, a total quantity of precoding matrices in $C^{(r)}$.

It should be further noted that for a given rank r, selection of a precoding matrix of the given rank r may be predefined, for example, the selection may be performed according to the foregoing two formulas, so that the user equipment does not need to feed back or report the precoding matrix indicator k. However, selection of the rank r may still be performed by the user equipment based on the channel estimation obtained by the user equipment.

Optionally, based on the obtained channel estimation value, the user equipment may obtain, by means of selection, an optimal rank r* of the user equipment according to the foregoing system equation, according to a predefined method for selecting a precoding matrix in various conditions of different rank r values, and according to a predefined criterion. The optimal rank r* may also be selected by using a criterion such as a capacity maximization criterion, a throughput maximization criterion, or a mutual information maximization criterion, which is not limited in the present invention. In addition, the foregoing optimal rank r* may be used as the RI in the foregoing CSI.

When the rank r and the precoding matrix indicator k are known, a signal to interference plus noise ratio $\text{SINR}_{r,k}^{(l)}(i)$ corresponding to the REi on each layer may be obtained according to the foregoing system equation. $l=0, 1, \ldots, r-1$, where $W(i)=P_k^{(r)}$, and the precoding matrix $P_k^{(r)}$ is a precoding matrix in the codebook or codebook subset $C^{(r)}$. The signal to interference plus noise ratio $\text{SINR}_{r,k}^{(l)}(i)$ corresponding to the REi on each layer may be obtained according to the used receiver and the foregoing system equation.

The foregoing obtaining the CQI based on the first codeword-to-layer mapping may be described by using $N_{CW}$ codewords and $N_{layer}$ layers as an example. A quantity of symbols included in each codeword is $M_{symb}^{(w)}$, $w=0, \ldots, N_{CW}-1$, a symbol sequence corresponding to each codeword is $d^{(w)}(0), d^{(w)}(1), \ldots,$ and $d^{(w)}(M_{symb}^{(w)}-1)$, where $w=0, \ldots, N_{CW}-1$; the quantity $N_{layer}$ of layers is equal to a used rank indicator. A symbol vector $x(i)$ sent by the REi may be indicated as:

$$x(i)=[x^{(0)}(i)x^{(1)}(i) \ldots x^{(r-1)}(i)]^T.$$

In the first codeword-to-layer mapping, each codeword may be mapped to one or more layers. Specifically, for example, the first codeword-to-layer mapping may be that shown in Table 1. It should be noted that a quantity $M_{symb}^{layer}$ of symbols transmitted on each layer is equal to a total quantity $N_{RE}$ of used REs.

TABLE 1

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 3 | 3 | $x^{(0)}(i) = d^{(0)}(i)$ $x^{(1)}(i) = d^{(1)}(i)$ $x^{(2)}(i) = d^{(2)}(i)$ | $M_{symb}^{layer} = M_{symb}^{(0)} = M_{symb}^{(1)} = M_{symb}^{(2)}$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |
| 4 | 4 | $x^{(0)}(i) = d^{(0)}(i)$ $x^{(1)}(i) = d^{(1)}(i)$ $x^{(2)}(i) = d^{(2)}(i)$ $x^{(3)}(i) = d^{(3)}(i)$ | $M_{symb}^{layer} = M_{symb}^{(0)} = M_{symb}^{(1)} = M_{symb}^{(2)} = M_{symb}^{(3)}$ |

A first mapping relationship of first codeword-to-layer indicated in Table 1 may include at least one of the following:

mappings between three codewords and three layers, where one codeword is allowed to be mapped to only one layer; or mappings between four codewords and four layers, where one codeword is allowed to be mapped to only one layer.

Each codeword may be successively mapped to a corresponding layer in sequence, and an index value of a layer to which a codeword is mapped is equal to an index value of the codeword. For example, in three codewords, a first codeword may be mapped to a first layer, a second codeword may be mapped to a second layer, and a third codeword may be mapped to a third layer.

Each codeword may be successively mapped to a corresponding layer in sequence, and a sequence formed by index values of layers to which the codewords are mapped is a cyclic shift of a sequence formed by index values of the codewords. For example, the first codeword may be mapped to the second layer, the second codeword may be mapped to the third layer, and the third layer may be mapped to the first layer, where a sequence 2, 3, and 1 is a cyclic shift of a sequence 1, 2, and 3. For another example, the first codeword may be mapped to the third layer, the second codeword may be mapped to the first layer, and the third codeword may be mapped to the second layer, and so on, where a sequence 3, 1, and 2 is a cyclic shift of a sequence 1, 2, and 3.

In addition, the foregoing first codeword-to-layer mapping may include at least the following mappings:

TABLE 2

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$ $x^{(1)}(i) = d^{(1)}(i)$ $x^{(2)}(i) = d^{(2)}(i)$ | $M_{symb}^{layer} = M_{symb}^{(0)} = M_{symb}^{(1)} = M_{symb}^{(2)}$ |
| 4 | 4 | $x^{(0)}(i) = d^{(0)}(i)$ $x^{(1)}(i) = d^{(1)}(i)$ $x^{(2)}(i) = d^{(2)}(i)$ $x^{(3)}(i) = d^{(3)}(i)$ | $M_{symb}^{layer} = M_{symb}^{(0)} = M_{symb}^{(1)} = M_{symb}^{(2)} = M_{symb}^{(3)}$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

In this way, it may be implemented that a CQI corresponding to each codeword may reflect only one layer, so that the CQI may reflect transmission of fewer layers. Therefore, in a condition of a same quantity of layers or a same rank, channel quality information may be indicated by more CQIs. Because data transmission is scheduled by the base station according to the CQI fed back by the user equipment, more CQI information and channel quality corresponding to each layer may be better described, so that the base station may obtain more accurate and specific channel quality information about the user equipment. Therefore, accuracy of scheduling may be improved, and in particular, a modulation and coding scheme may be more accurately determined. On the other hand, during implementation of MU-MIMO transmission, accuracy of CQI adjustment may be improved, and a quantity of paired UE may be increased, thereby enhancing a throughput of an entire system.

Optionally, the first codeword-to-layer mapping or the second codeword-to-layer mapping is configured by the base station by using signaling. That is, it may be implemented that the foregoing first codeword-to-layer mapping or second codeword-to-layer mapping is set by the base station. The first codeword-to-layer mapping or the second codeword-to-layer mapping may be specifically configured by using higher layer signaling such as radio resource control (RRC) signaling, or dynamic signaling such as DCI. In addition, this step may be specifically performed before step 102.

Specifically, using the first codeword-to-layer mapping as an example, the first codeword-to-layer mapping may include multiple different tables whose forms are similar to that of Table 2, and the different tables may be indicated by using different indexes. For example, two, four, or eight tables may be included, and correspondingly, these tables may be indicated by using one bit, two bits, or three bits. The index or indicator information may be sent to the user equipment by using the foregoing RRC signaling or DCI information.

For Table 1, using two codewords and three layers, that is, $N_{CW}=2$ and $N_{layer}=3$, as an example, a symbol $d^{(0)}(i)$ in a first codeword is mapped to a first layer, that is, $x^{(0)}(i)=d^{(0)}(i)$; and a symbol $d^{(1)}(i)$ in a second codeword is mapped to a second layer and a third layer, that is, $x^{(1)}(i)=d^{(1)}(2i)$ and $x^{(2)}(i)=d^{(1)}(2i+1)$. In this case, the first codeword includes a symbol carried on a first layer on each resource element, that is, $x^{(0)}(i)$, where $i=0, \ldots, M_{symb}^{layer}-1$; and the second codeword includes symbols carried on a second layer and a third layer on each resource element, that is, $x^{(1)}(i)$ and $x^{(2)}(i)$, where $i=0, \ldots, M_{symb}^{layer}-1$.

Using three codewords and three layers, that is, $N_{CW}=3$ and $N_{layer}=3$, as an example, a symbol $x^{(0)}(i)$ in a first codeword is mapped to a first layer, that is, $x^{(0)}(i)=d^{(0)}(i)$; and a symbol $d^{(1)}(i)$ in a second codeword and a symbol $d^{(3)}(i)$ in a third codeword are respectively mapped to a second layer and a third layer, that is, $x^{(1)}(i)=d^{(1)}(i)$, and $x^{(2)}(i)=d^{(2)}(i)$. In this case, an $l^{th}$ codeword includes a symbol carried on an $l^{th}$ layer on each resource element, that is, $x^{(l-1)}(i)$, where $i=0, \ldots, M_{symb}^{layer}-1$, and $l=1, 2, 3$.

In a method similar to the foregoing rank selection process, whether the precoding matrix is predefined or selected by the user equipment, on condition that an optimally selected rank $r^*$ is obtained, the user equipment may obtain an SINR of each layer on each resource element REi, that is, $SINR_{r^*}^{(l)}(i)$, where $l=0, \ldots, r^*-1$. Equivalently and correspondingly, an SINR corresponding to each symbol $x^{(l)}(i)$ in a symbol vector $x(i)$ sent on the resource element REi is $SINR_{r^*}^{(l)}(i)$, where $l=0, \ldots, r^*-1$, and $$x(i)=[x^{(0)}(i)x^{(1)}(i) \ldots x^{(r^*-1)}(i)]^T.$$

Therefore, an SINR corresponding to each symbol in each codeword may be obtained by using the foregoing first codeword-to-layer mapping.

Using the first codeword-to-layer mapping described in Table 1 as an example, it can be easily learned that when there are two codewords and three layers, that is, when $N_{CW}=2$ and $N_{layer}=3$, an SINR of each symbol included in a first codeword is $SINR_{r^*}^{(0)}(i)$, where $i=0, \ldots, M_{symb}^{layer}-1$; and an SINR of each symbol included in a second codeword is $SINR_{r^*}^{(1)}(i)$, where $i=0, \ldots, M_{symb}^{layer}-1$. It can be easily learned that when there are three codewords and three layers, that is, when $N_{CW}=3$ and $N_{layer}=3$, an SINR of each symbol included in a first codeword is $SINR_{r^*}^{(0)}(i)$, where $i=0, \ldots, M_{symb}^{layer}-1$; and a symbol $d^{(1)}(i)$ in a second codeword and a symbol $d^{(3)}(i)$ in a third codeword are respectively mapped to a second layer and a third layer, that is, $x^{(1)}(i)=d^{(1)}(i)$, and $x^{(2)}(i)=d^{(2)}(i)$. In this case, an $l^{th}$ codeword is $SINR_{r^*}^{(l-1)}(i)$, where $i=0, \ldots, M_{symb}^{layer}-1$, and $l=1, 2, 3$.

In addition, by using an equivalent SNR mapping method, SINRs of multiple symbols included in each codeword may be mapped to an equivalent SNR, that is, SINRs of multiple symbols included in each codeword are mapped to an ESNR. In this way, each codeword may obtain an equivalent SNR, that is, an ESNR, and an ESNR corresponding to each codeword may be referred to as an SNR of the codeword. An SNR of each codeword may be quantized to a CQI. For example, using a 4-bit CQI, that is, 16 CQI index values, as an example for description, for quantization of an SNR of a codeword to a CQI, refer to a relationship shown in Table 3.

TABLE 3

| CQI | Modulation order | Bit rate × 1024 | ESNR range |
|---|---|---|---|
| 0 | Exceed a range | | (−∞, −7) |
| 1 | 2 | 78 | [−7, −5.108) |
| 2 | 2 | 120 | [−5.108, −3.216) |
| 3 | 2 | 193 | [−3.216, −1.324) |
| 4 | 2 | 308 | [−1.324, 0.568]) |
| 5 | 2 | 449 | [0.568, 2.460) |
| 6 | 2 | 602 | [2.460, 4.352) |
| 7 | 4 | 378 | [4.352, 6.244) |
| 8 | 4 | 490 | [6.244, 8.136) |
| 9 | 4 | 616 | [8.136, 10.028) |
| 10 | 6 | 466 | [10.028, 11.920) |
| 11 | 6 | 567 | [11.920, 13.812) |
| 12 | 6 | 666 | [13.812, 15.704) |
| 13 | 6 | 772 | [15.704, 17.596) |
| 14 | 6 | 873 | [17.596, 19.4880) |
| 15 | 6 | 948 | [19.4880, +∞) |

Different ESNRs are quantized to CQI index values according to Table 3. For example, according to Table 3, if an SNR of a codeword falls within an interval [−5.108, −3.216), a CQI corresponding to the codeword is 2. That is, if an SNR of a codeword meets −5.108≤ESNR<−3.216, a CQI corresponding to the codeword is 2.

Optionally, the foregoing CQI may reflect transmission in a sub-band, and therefore may be referred to as a sub-band CQI. In addition, the foregoing CQI may also reflect transmission in system bandwidth, and therefore may be referred to as a wideband CQI.

In addition, the CQI and the RI may be fed back or reported to the base station in a same subframe, or the CQI and the RI may be fed back or reported to the base station in different subframes. Specifically, the CQI and the RI may be reported to the base station by using a physical uplink shared channel (PUSCH) or a physical uplink control channel (PUCCH). When being reported to the base station by using the PUCCH, joint coding may be performed on the RI and the CQI. Alternatively, when being reported to the base station by using the PUCCH, joint coding may be performed on the CQI and a PMI, and the RI may be reported in a subframe different from that of the PMI and the CQI.

103. The user equipment receives a second reference signal set sent by the base station.

Optionally, the foregoing second reference signal set may be a reference signal set the same as or different from the foregoing first reference signal set.

104. The user equipment receives, based on the second reference signal set and a second codeword-to-layer mapping, data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

That a quantity of layers to which at least one codeword is mapped in the first codeword-to-layer mapping is less than a quantity of layers to which a codeword is mapped in the second codeword-to-layer mapping may be understood as: a quantity of layers to which at least one codeword is mapped in the mapping of a second codeword to a layer is greater than a quantity of layers to which a codeword is mapped in the first codeword-to-layer mapping. For example, the first codeword-to-layer mapping and the mapping of a second codeword to a layer allow a same quantity of layers or a same rank. However, a maximum quantity of codewords allowed by the second codeword-to-layer mapping is less, or a maximum quantity of codewords allowed by the first codeword-to-layer mapping is greater. For example, the first codeword-to-layer mapping is shown in Table 1, and the second codeword-to-layer mapping is shown in Table 4, where a maximum quantity of codewords allowed by the former is four, and a maximum quantity of codewords allowed by the latter is two.

TABLE 4

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
|  |  | $x^{(1)}(i) = d^{(0)}(2i + 1)$ |  |
| 2 | 2 | $x^{(0)}(i) = d^{(0)}(i)$ | $M_{symb}^{layer} = M_{symb}^{(0)} = M_{symb}^{(1)}$ |
|  |  | $x^{(1)}(i) = d^{(1)}(i)$ |  |
| 3 | 1 | $x^{(0)}(i) = d^{(0)}(3i)$ | $M_{symb}^{layer} = M_{symb}^{(0)}/3$ |
|  |  | $x^{(1)}(i) = d^{(0)}(3i + 1)$ |  |
|  |  | $x^{(2)}(i) = d^{(0)}(3i + 2)$ |  |
| 3 | 2 | $x^{(0)}(i) = d^{(0)}(i)$ | $M_{symb}^{layer} = M_{symb}^{(0)} = M_{symb}^{(1)}/2$ |
|  |  | $x^{(1)}(i) = d^{(1)}(2i)$ |  |
|  |  | $x^{(2)}(i) = d^{(1)}(2i + 1)$ |  |
| 4 | 1 | $x^{(0)}(i) = d^{(0)}(4i)$ | $M_{symb}^{layer} = M_{symb}^{(0)}/4$ |
|  |  | $x^{(1)}(i) = d^{(0)}(4i + 1)$ |  |
|  |  | $x^{(2)}(i) = d^{(0)}(4i + 2)$ |  |
|  |  | $x^{(3)}(i) = d^{(0)}(4i + 3)$ |  |
| 4 | 2 | $x^{(0)}(i) = d^{(0)}(2i)$ | $M_{symb}^{layer} = M_{symb}^{(0)}/2 = M_{symb}^{(1)}/2$ |
|  |  | $x^{(1)}(i) = d^{(0)}(2i + 1)$ |  |
|  |  | $x^{(2)}(i) = d^{(1)}(2i)$ |  |
|  |  | $x^{(3)}(i) = d^{(1)}(2i + 1)$ |  |

Optionally, a quantity of layers used by the base station to send the data is less than or equal to a quantity of layers that is indicated by the RI, and a transmission manner (for example, a modulation and coding scheme) used by the base station to send the data is selected by the base station based on the CQI. For example, after receiving the foregoing CSI, the base station may determine, according to the foregoing RI, the quantity of layers used to send the data, where the quantity of layers is less than or equal to the quantity of layers that is indicated by the RI. The base station selects a corresponding modulation and coding scheme according to the foregoing CQI, so as to generate the foregoing data.

Optionally, the foregoing data may be carried on a physical downlink shared channel (PDSCH) or a user-specific channel.

Optionally, step 104 may include:
obtaining a channel estimation based on the second reference signal set; and
receiving the data according to the channel estimation.

For a method for calculating a channel estimation, refer to the foregoing description, and details are not repeatedly described herein.

Optionally, the process of receiving the data may include:
performing channel equalization according to a receiver algorithm, and then performing demodulation, decoding, and the like according to an equalized signal.

The following describes in detail an example of the process of receiving the data.

Based on the second reference signal set, a channel estimation value of the user equipment on the resource element REi may be indicated as H(i), and based on the channel estimation, a received signal may be indicated as:

$$y(i)=H(i)W(i)x(i)+n(i), i=0,1,\ldots,N_{RE}-1;$$

where H(i) is an $N_R \times N_T$ matrix, $N_R$ is a quantity of receive antennas of the user equipment, and $N_T$ is a quantity of transmit antennas of the base station; y(i) is a received signal vector of $N_R$ dimensions of the user equipment on the resource element REi, and W(i) is an $N_T \times r$ precoding matrix used on the resource element REi, where r is a rank of the precoding matrix, or a quantity of layers of transmission, or a rank of transmission; x(i) is a symbol vector of r dimensions that is sent by the base station, and n(i) is measured noise of $N_R$ dimensions, which may include thermal noise of a receiver and intra-cell or inter-cell interference; and $N_{RE}$ is a quantity of resource elements used to receive the data. The base station may notify the user equipment of the precoding matrix W(i) by using a transmission precoding matrix indicator, or the precoding matrix W(i) is predefined. In this way, the received signal may be equivalent to:

$$y(i)=H_e(i)x(i)+n(i), i=0,1,\ldots,N_{RE}-1;$$

where $H_e(i)=H(i)W(i)$ is an $N_R \times r$ matrix.

Alternatively, based on the second reference signal set, a channel estimation value on the resource element REi may be indicated as $H_e(i)$, and based on the channel estimation, a received signal may be indicated as:

$$y(i)=H_e(i)x(i)+n(i), i=0,1,\ldots,N'_{RE}-1;$$

where $H_e(i)$ is an $N_R \times r$ matrix, $N_R$ is a quantity of receive antennas of the user equipment, and r is the quantity of layers of transmission or a rank of transmission; y(i) is a received signal vector of $N_R$ dimensions of the user equipment on the resource element REi; x(i) is a symbol vector of r dimensions that is sent by the base station, and n(i) is measured noise of $N_R$ dimensions, which may include thermal noise of the receiver and intra-cell or inter-cell interference; and $N'_{RE}$ is a quantity of resource elements used to receive the data.

The user equipment may be notified of the quantity of layers of transmission, or the rank of transmission, or the rank r of the precoding matrix in the foregoing formula by using downlink control information (DCI), or the quantity of layers of transmission, or the rank of transmission, or the rank r of the precoding matrix may be predefined, or may be limited to 1, 2, 3, or the like by using higher layer signaling.

Optionally, in the second codeword-to-layer mapping, using $N'_{CW}$ codewords and $N'_{layer}$ transport layers as an example, a quantity of symbols included in each codeword is $M'_{symb}^{(w)}$, w=0, ..., $N'_{CW}$−1, and a symbol sequence corresponding to each codeword is $d^{(w)}(0), d^{(w)}(1), \ldots,$ and $d^{(w)}(M'_{symb}^{(w)}-1)$, where w=0, ..., $N'_{CW}$−1. A symbol vector x(i) sent on each resource element REi may be indicated as:

$$x(i)=[x^{(0)}(i) x^{(1)}(i) \ldots x^{(r-1)}(i)]^T;$$

where $r=N'_{layer}$. Each codeword may be mapped to one or more layers, which is specifically shown in Table 3. It should be noted that a quantity $M'_{symb}{}^{layer}$ of symbols transmitted on each layer is equal to a total quantity $N'_{RE}$ of used REs.

As shown in Table 4, using two codewords and three layers, that is, $N_{CW}=2$ and $N_{layer}=3$, as an example, a symbol $d^{(0)}(i)$ in a first codeword is mapped to a first layer, that is, $x^{(0)}(i)=d^{(0)}(i)$; and a symbol $d^{(1)}(i)$ in a second codeword is mapped to a second layer and a third layer, that is, $x^{(1)}(i)=d^{(1)}(2i)$ and $x^{(2)}(i)=d^{(1)}(2i+1)$. In this case, the first codeword includes a symbol carried on a first layer on each resource element, that is, $x^{(0)}(i)$, where $i=0, \ldots, M_{symb}{}^{layer}-1$; and the second codeword includes symbols carried on a second layer and a third layer on each resource element, that is, $x^{(1)}(i)$ and $x^{(2)}(i)$, where $i=0, \ldots, M_{symb}{}^{layer}-1$. In this way, according to the foregoing second codeword-to-layer mapping, the symbol carried on the first layer may be demodulated and decoded so as to obtain information corresponding to the first codeword, and the symbols carried on the second layer and the third layer may be demodulated and decoded so as to obtain information corresponding to the second codeword. In this way, the foregoing data that includes the information corresponding to the first codeword and the information corresponding to the second codeword may be obtained.

In the foregoing technical solution, user equipment receives a first reference signal set sent by a base station, obtains, based on the first reference signal set and a first codeword-to-layer mapping, CSI that includes an RI and a CQI, and reports the CSI. When receiving data sent by the base station, the user equipment receives the data based on a second reference signal set and a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling is improved, and in particular, precision of an MCS determined during data transmission is improved; and during implementation of MU-MIMO transmission, accuracy of CQI adjustment may be improved, and a quantity of paired user equipment may be increased, thereby enhancing a system throughput.

Figure 2:
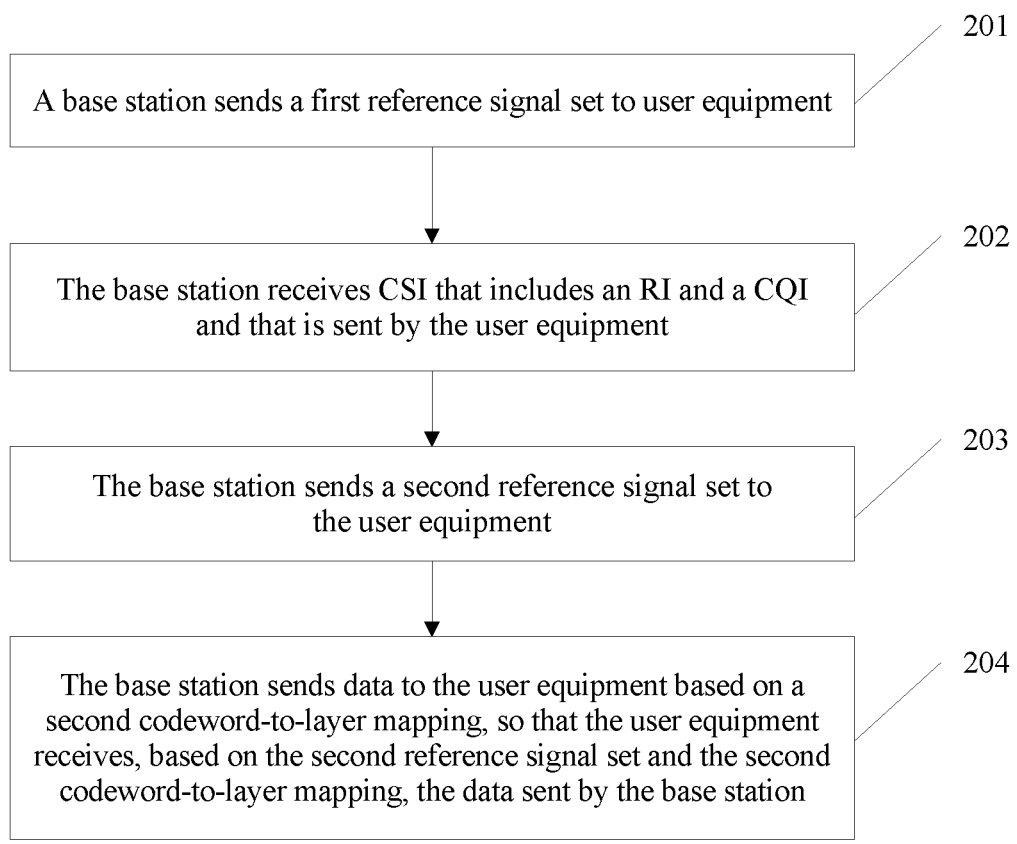
FIG. 2 is a schematic flowchart of another data transmission method according to an embodiment of the present invention.

Referring to FIG. 2, FIG. 2 is a schematic flowchart of another data transmission method according to an embodiment of the present invention. As shown in FIG. 2, the method includes the following steps.

201. A base station sends a first reference signal set to user equipment.

202. The base station receives CSI that includes an RI and a CQI and that is sent by the user equipment, where the CSI is obtained by the user equipment based on the first reference signal set and a first codeword-to-layer mapping, the first codeword-to-layer mapping includes a first mapping between at least one codeword and at least one transport layer, and the transport layer is a transport layer between the base station and the user equipment.

It should be noted that for the foregoing first reference signal set, CSI, and first codeword-to-layer mapping, refer to the description in the embodiment shown in FIG. 1, and details are not repeatedly described herein.

203. The base station sends a second reference signal set to the user equipment.

204. The base station sends data to the user equipment based on a second codeword-to-layer mapping, so that the user equipment receives, based on the second reference signal set and the second codeword-to-layer mapping, the data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

Optionally, the foregoing RI and CQI are obtained in step 202. A quantity of layers used for the foregoing sending the data may be less than or equal to a quantity of layers that is indicated by the RI, and a transmission manner (for example, a modulation and coding scheme) used to send the data may be selected based on the CQI. In this way, in step 204, the foregoing data is sent based on the quantity of layers that is less than or equal to the quantity of layers that is indicated by the RI, and an equivalent SNR of a layer used to send the foregoing data may be obtained according to the foregoing CQI, that is, an equivalent SNR of each layer is equal to an equivalent SNR of a corresponding codeword. In this way, modulation and coding of the foregoing data may be implemented based on a modulation and coding scheme corresponding to an equivalent SNR of each layer.

Optionally, after an equivalent SNR of a codeword is obtained, the equivalent SNR may be mapped to an MCS index of the codeword according to a pre-determined criterion.

Optionally, each MCS index may correspond to a modulation scheme and a bit rate of channel coding. Correspondingly, according to a modulation scheme and a bit rate of channel coding that are corresponding to an MCSI, block error rates (BLER) under values corresponding to different SNRs may be obtained by means of link simulation. Therefore, corresponding to a modulation scheme and a coding bit rate, a corresponding BLER curve may be obtained, where the curve may be stored by using a table with discrete values.

By using a set of the foregoing BLER curve, an SNR of each codeword may be mapped to an MCS index value according to a pre-determined criterion. The pre-determined criterion may be an efficiency maximization criterion meeting a condition that a target BLER is less than a preset threshold, for example, the threshold may be 10%.

According to the pre-determined criterion, a corresponding MCS index may be obtained by searching the BLER curve set. An equivalent SNR of a codeword and a corresponding MCS index may also be stored in the table in advance according to a searching result, so that a corresponding MCS index value may be obtained directly according to an equivalent SNR range of a codeword. For example, using 29 MCS indexes as an example, according to an ESNR value range corresponding to each codeword, different ESNRs may be quantized to MCS indexes according to Table 5. For example, according to Table 4, if an ESNR falls within an interval $[-1.324, -0.3461)$, a corresponding MCS index is 4, that is, if an ESNR meets $-1.324 \leq ESNR < -0.3461$, a corresponding MCS index is 4.

TABLE 5

| MCS index | Modulation order | Bit rate × 1024 | Efficiency | ESNR range |
|---|---|---|---|---|
| 0 | 2 | 120 | 0.2344 | [−5.108, −4.0126) |
| 1 | 2 | 157 | 0.3057 | [−4.0126, −3.216) |
| 2 | 2 | 193 | 0.3770 | [−3.216, −2.1959) |
| 3 | 2 | 251 | 0.4893 | [−2.1959, −1.324) |
| 4 | 2 | 308 | 0.6016 | [−1.324, −0.3461) |
| 5 | 2 | 379 | 0.7393 | [−0.3461, 0.568) |
| 6 | 2 | 449 | 0.8770 | [0.568, 1.5143) |
| 7 | 2 | 526 | 1.0264 | [1.5143, 2.460) |
| 8 | 2 | 602 | 1.1758 | [2.460, 3.5196) |
| 9 | 2 | 679 | 1.3262 | [3.5196, 3.8185) |
| 10 | 4 | 340 | 1.3262 | [3.8185, 4.352) |
| 11 | 4 | 378 | 1.4766 | [4.352, 5.4201) |
| 12 | 4 | 434 | 1.6954 | [5.4201, 6.244) |
| 13 | 4 | 490 | 1.9141 | [6.244, 7.0706) |
| 14 | 4 | 553 | 2.1602 | [7.0706, 8.136) |
| 15 | 4 | 616 | 2.4063 | [8.136, 8.8785) |
| 16 | 4 | 658 | 2.5684 | [8.8785, 9.4199) |
| 17 | 6 | 438 | 2.5684 | [9.4199, 10.028) |
| 18 | 6 | 466 | 2.7305 | [10.028, 11.1523) |
| 19 | 6 | 517 | 3.0264 | [11.1523, 11.920) |
| 20 | 6 | 567 | 3.3223 | [11.920, 12.8233) |
| 21 | 6 | 616 | 3.6123 | [12.8233, 13.812) |
| 22 | 6 | 666 | 3.9023 | [13.812, 14.7881) |
| 23 | 6 | 719 | 4.2129 | [14.7881, 15.704) |
| 24 | 6 | 772 | 4.5234 | [15.704, 16.5953) |
| 25 | 6 | 822 | 4.8193 | [16.5953, 17.596) |
| 26 | 6 | 873 | 5.1152 | [17.596, 18.4662) |
| 27 | 6 | 910 | 5.3350 | [18.4662, 19.4880) |
| 28 | 6 | 948 | 5.5547 | [19.4880, +∞) |

The user equipment may be notified, by using downlink control information, of the MCS index corresponding to the foregoing codeword. In addition, the user equipment may be further notified, by using the downlink control information, of a quantity of layers of the transmission. The quantity of layers of the transmission and the MCS index corresponding to the codeword may be jointly coded. Specifically, the downlink control information may be sent to the user equipment by using a physical downlink control channel or an enhanced physical downlink control channel.

Optionally, in step 204, an estimated equivalent SNR value of each layer may be adjusted according to an actual quantity $N'_{layer}$ of layers of transmission and a rank indicator RI reported by the user equipment. For example, if the rank indicator reported by the user equipment is RI, and the actual quantity of layers of transmission is $N'_{layer}$, an adjusted equivalent SNR of each layer is:

$$ESNR'^{(l)} = ESNR^{(l)} + 10\log_{10}\left(\frac{RI}{N'_{layer}}\right), l = 0, \ldots, N'_{layer} - 1;$$

where both an equivalent SNR $ESNR^{(l)}$ before adjustment and the adjusted equivalent SNR $ESNR'^{(l)}$ are indicated by using a value of dB. It can be easily learned that $ESNR'^{(l)} = ESNR^{(l)}$ if the quantity of layers of transmission is equal to the rank indicator.

In addition, for MU-MIMO transmission, power-on-layer corresponding to each user changes because of power allocation, and in this case, the foregoing equivalent SNR $ESNR'^{(l)}$ of each layer corresponding to the user equipment may be further adjusted to:

$$ESNR''^{(l)} = ESNR'^{(l)} + 10\log_{10}(g^{(l)}), l = 0, \ldots, N'_{layer} - 1;$$

where $g^{(l)}$ is a power-on-layer gain corresponding to the user equipment after multi-user pairing is performed, where the power gain herein is a linear value. It can be easily learned that $ESNR''^{(l)} = ESNR'^{(l)}$ if the multi-user pairing is not performed, or the power does not change after the power allocation.

As shown in Table 1, using two codewords and three layers, that is, $N_{CW}=2$ and $N_{layer}=3$, as an example, a first codeword is mapped to a first layer; and a symbol $d^{(1)}(i)$ in a second codeword is mapped to a second layer and a third layer. Therefore, an estimated equivalent SNR value of the first layer is an estimated equivalent SNR value of the first codeword. Both an estimated equivalent SNR value of the second layer and an estimated equivalent SNR value of the second layer are equal to an estimated equivalent SNR value of the second codeword. As shown in Table 1, using three codewords and three layers, that is, $N_{CW}=3$ and $N_{layer}=3$, as an example, each codeword is mapped to a layer. Therefore, an estimated equivalent SNR value of each layer is equal to an estimated equivalent SNR value of each codeword.

Optionally, that a quantity of layers to which at least one included codeword is mapped in the first codeword-to-layer mapping is less than a quantity of layers to which a codeword is mapped in the second codeword-to-layer mapping may be understood as: a quantity of layers to which at least one included codeword is mapped in the mapping of a second codeword to a layer is greater than a quantity of layers to which a codeword is mapped in the first codeword-to-layer mapping. For example, the first codeword-to-layer mapping and the mapping of a second codeword to a layer allow a same quantity of layers or a same rank. However, a maximum quantity of codewords allowed by the second codeword-to-layer mapping is less, or a maximum quantity of codewords allowed by the first codeword-to-layer mapping is greater. For example, the first codeword-to-layer mapping is shown in Table 1, and the second codeword-to-layer mapping is shown in Table 3, where a maximum quantity of codewords allowed by the former is four, and a maximum quantity of codewords allowed by the latter is two.

Optionally, the first codeword-to-layer mapping may include at least one of the following:

mappings between three codewords and three layers, where one codeword is allowed to be mapped to only one layer; or mappings between four codewords and four layers, where one codeword is allowed to be mapped to only one layer.

For example, the foregoing first codeword-to-layer mapping may include at least the following mappings:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$<br>$x^{(1)}(i) = d^{(1)}(i)$<br>$x^{(2)}(i) = d^{(2)}(i)$ | $M_{symb}^{layer} = M_{symb}^{(0)} =$<br>$M_{symb}^{(1)} = M_{symb}^{(2)}$ |
| 4 | 4 | $x^{(0)}(i) = d^{(0)}(i)$<br>$x^{(1)}(i) = d^{(1)}(i)$<br>$x^{(2)}(i) = d^{(2)}(i)$<br>$x^{(3)}(i) = d^{(3)}(i)$ | $M_{symb}^{layer} = M_{symb}^{(0)} =$<br>$M_{symb}^{(1)} = M_{symb}^{(2)} = M_{symb}^{(3)}$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

In this way, it may be implemented that a CQI corresponding to each codeword may reflect only one layer, so that the CQI may reflect transmission of fewer layers. Therefore, in a condition of a same quantity of layers or a same rank, channel quality information may be indicated by more CQIs. Because data transmission is scheduled by the base station according to the CQI fed back by the user equipment, more CQI information may improve accuracy of scheduling, so that a modulation and coding scheme can be more accurately determined. On the other hand, more UE pairing may be implemented during MU-MIMO transmission, thereby enhancing a throughput of an entire system.

Optionally, the method may further include:

configuring, by the base station, the first or second codeword-to-layer mapping for the user equipment by using signaling. That is, it may be implemented that the foregoing first or second codeword-to-layer mapping is set by the base station. The first or second codeword-to-layer mapping may be specifically configured for the user equipment by using higher layer signaling such as radio resource control (RRC for short) signaling, or dynamic signaling such as downlink control information (DCI for short). In addition, this step may be specifically performed before step 202.

Optionally, for the foregoing data sent to the user equipment based on a second codeword-to-layer mapping, specifically, using $N'_{CW}$ codewords and $N'_{layer}$ transport layers as an example, a quantity of symbols included in each codeword is $M'_{symb}{}^{(w)}$, $w=0, \ldots, N'_{CW}-1$, and a symbol sequence corresponding to each codeword is $d^{(w)}(0)$, $d^{(w)}(1), \ldots,$ and $d^{(w)}(M'_{symb}{}^{(w)}-1)$, where $w=0, \ldots, N'_{CW}-1$. A symbol vector $x(i)$ sent on each resource element $RE_i$ may be indicated as:

$$x(i)=[x^{(0)}(i)x^{(1)}(i)\ldots x^{(r-1)}(i)]^T;$$

where $r=N'_{layer}$. Each codeword may be mapped to one or more layers, which is specifically shown in Table 3. It should be noted that a quantity $M'_{symb}{}^{layer}$ of symbols transmitted on each layer is equal to a total quantity $N'_{RE}$ of used REs. In this way, it is implemented that the foregoing data is sent on multiple layers by using multiple resource elements.

As shown in Table 4, using two codewords and three layers, that is, $N_{CW}=2$ and $N_{layer}=3$, as an example, a symbol $d^{(0)}(i)$ in a first codeword is mapped to a first layer, that is, $x^{(0)}(i)=d^{(0)}(i)$; and a symbol $d^{(1)}(i)$ in a second codeword is mapped to a second layer and a third layer, that is, $x^{(1)}(i)=d^{(1)}(2i)$ and $x^{(2)}(i)=d^{(1)}(2i+1)$. In this case, the first codeword includes a symbol carried on a first layer on each resource element, that is, $x^{(0)}(i)$, where $i=0, \ldots, M_{symb}{}^{layer}-1$; and the second codeword includes symbols carried on a second layer and a third layer on each resource element, that is, $x^{(1)}(i)$ and $x^{(2)}(i)$, where $i=0, \ldots, M_{symb}{}^{layer}-1$.

In the foregoing technical solution, a first reference signal set is sent to user equipment, so that the user equipment can obtain, based on the first reference signal set and a first codeword-to-layer mapping, CSI that includes an RI and a CQI, and report the CSI. A second reference signal set is sent to the user equipment, and data is sent based on a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling may be improved, and in particular, precision of an MCS used during data transmission may be more accurately determined; and during implementation of MU-MIMO transmission, accuracy of CQI adjustment may be improved, and a quantity of paired user equipment may be increased, thereby enhancing a throughput of a communications system.

The following describes an apparatus embodiment of the present invention. The apparatus embodiment of the present invention is used to perform the methods implemented in method embodiments 1 to 2 of the present invention. For ease of description, only a part related to this embodiment of the present invention is shown. For technical details that are not disclosed, refer to Embodiment 1 and Embodiment 2 of the present invention.

Figure 3:
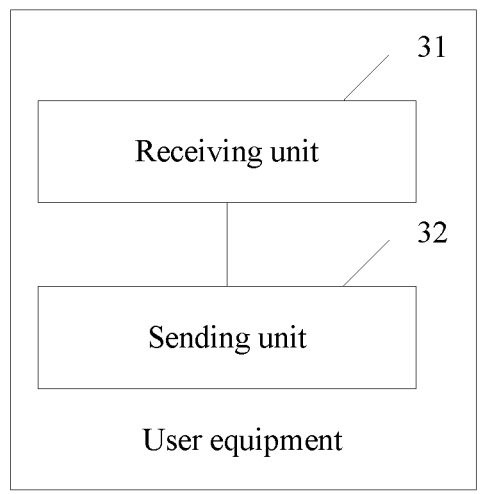
FIG. 3 is a schematic structural diagram of user equipment according to an embodiment of the present invention.

Referring to FIG. 3, FIG. 3 is a schematic structural diagram of user equipment according to an embodiment of the present invention. As shown in FIG. 3, the user equipment includes a receiving unit 31 and a sending unit 32.

The receiving unit 31 is configured to receive a first reference signal set sent by a base station.

Optionally, a reference signal in the foregoing first reference signal set may be a cell-specific CRS, or a reference signal in the foregoing first reference signal set may be a CSI RS, for example, a CRS in an LTE R8 system or a CSI RS in an LTE R8 system. In addition, the foregoing first reference signal set may include one or more reference signals.

The sending unit 32 is configured to obtain, based on the first reference signal set and a first codeword-to-layer mapping, channel state information CSI that includes a rank indicator RI and a channel quality indicator CQI, and send the CSI to the base station, where the first codeword-to-layer mapping includes a first mapping between at least one codeword and at least one transport layer, and the transport layer is a transport layer between the base station and the user equipment.

Optionally, the sending unit 32 may be configured to obtain a channel estimation based on the first reference signal set, obtain the CSI that includes the RI and the CQI based on the channel estimation, and send the CSI to the base station. In addition, for multiple implementation manners of the sending unit 32, refer to step 102 in the embodiment shown in FIG. 1. Details are not repeatedly described herein. In addition, for the foregoing first codeword-to-layer mapping, refer to a first codeword-to-layer mapping described in the embodiment shown in FIG. 1.

The receiving unit 31 is further configured to receive a second reference signal set sent by the base station.

The receiving unit 31 is further configured to receive, based on the second reference signal set and a second codeword-to-layer mapping, data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

Optionally, for multiple implementation manners of the receiving unit 31, refer to step 104 in the embodiment shown in FIG. 1. Details are not repeatedly described herein.

Optionally, a quantity of layers used by the base station to send the data is less than or equal to a quantity of layers that is indicated by the RI, and a transmission manner (for example, a modulation and coding scheme) used by the base station to send the data is selected by the base station based on the CQI.

The first codeword-to-layer mapping may include at least one of the following:

mappings between three codewords and three layers, where one codeword is allowed to be mapped to only one layer; or mappings between four codewords and four layers, where one codeword is allowed to be mapped to only one layer.

In addition, the foregoing first codeword-to-layer mapping may include at least the following mappings:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$ | $M_{symb}^{layer} = M_{symb}^{(0)} =$ |
|   |   | $x^{(1)}(i) = d^{(1)}(i)$ | $M_{symb}^{(1)} = M_{symb}^{(2)}$ |
|   |   | $x^{(2)}(i) = d^{(2)}(i)$ | |
| 4 | 4 | $x^{(0)}(i) = d^{(0)}(i)$ | $M_{symb}^{layer} = M_{symb}^{(0)} =$ |
|   |   | $x^{(1)}(i) = d^{(1)}(i)$ | $M_{symb}^{(1)} = M_{symb}^{(2)} = M_{symb}^{(3)}$ |
|   |   | $x^{(2)}(i) = d^{(2)}(i)$ | |
|   |   | $x^{(3)}(i) = d^{(3)}(i)$ | | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

In this way, it may be implemented that a CQI corresponding to each codeword may reflect only one layer, so that the CQI may reflect transmission of fewer layers. Therefore, in a condition of a same quantity of layers or a same rank, channel quality information may be indicated by more CQIs. Because data transmission is scheduled by the base station according to the CQI fed back by the user equipment, more CQI information may improve accuracy of scheduling, so that a modulation and coding scheme can be more accurately determined. On the other hand, more UE pairing may be implemented during MU-MIMO transmission, thereby enhancing a throughput of an entire system.

Optionally, the first or second codeword-to-layer mapping may be configured by the base station by using signaling. That is, it may be implemented that the foregoing first or second codeword-to-layer mapping is set by the base station. The first or second codeword-to-layer mapping may be specifically configured by using higher layer signaling such as radio resource control RRC for short) signaling, or dynamic signaling such as downlink control information (DCI for short).

In the foregoing technical solution, user equipment receives a first reference signal set sent by a base station, obtains, based on the first reference signal set and a first codeword-to-layer mapping, CSI that includes an RI and a CQI, and reports the CSI, where the CQI included in the CSI is obtained based on the first codeword-to-layer mapping. When receiving data sent by the base station, the user equipment obtains the data based on a second reference signal set and a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling may be improved, and in particular, precision of an MCS used to transmit data may be more accurately determined; and during implementation of MU-MIMO transmission, accuracy of CQI adjustment may be improved, and a quantity of paired user equipment may be increased, thereby enhancing a throughput of an entire system.

Figure 4:
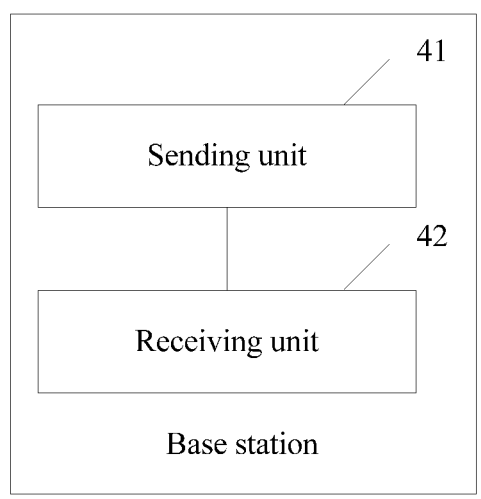
FIG. 4 is a schematic structural diagram of a base station according to an embodiment of the present invention.

Referring to FIG. 4, FIG. 4 is a schematic structural diagram of a base station according to an embodiment of the present invention. As shown in FIG. 4, the base station includes: a sending unit 41 and a receiving unit 42.

The sending unit 41 is configured to send a first reference signal set to user equipment.

The receiving unit 42 is configured to receive channel state information CSI that includes a rank indicator RI and a channel quality indicator CQI and that is sent by the user equipment, where the CSI is obtained by the user equipment based on the first reference signal set and a first codeword-to-layer mapping, the first codeword-to-layer mapping includes a first mapping between at least one codeword and at least one transport layer, and the transport layer is a transport layer between the base station and the user equipment.

It should be noted that for the foregoing first reference signal set, CSI, and first codeword-to-layer mapping, refer to the description in the embodiment shown in FIG. 1, and details are not repeatedly described herein.

The sending unit 41 is further configured to send a second reference signal set to the user equipment.

The sending unit 41 is further configured to send data to the user equipment based on a second codeword-to-layer mapping, so that the user equipment receives, based on the second reference signal set and the second codeword-to-layer mapping, the data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

Optionally, for multiple implementation manners of the sending unit 41, refer to step 204 in the embodiment shown in FIG. 2. Details are not repeatedly described herein.

Optionally, a quantity of layers used for the foregoing sending the data may be less than or equal to a quantity of layers that is indicated by the RI, and a transmission manner (for example, a modulation and coding scheme) used to send the data may be selected based on the CQI.

Optionally, the first codeword-to-layer mapping may include at least one of the following:

mappings between three codewords and three layers, where one codeword is allowed to be mapped to only one layer; or mappings between four codewords and four layers, where one codeword is allowed to be mapped to only one layer.

For example, the foregoing first codeword-to-layer mapping may include at least the following mappings:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$<br>$x^{(1)}(i) = d^{(1)}(i)$<br>$x^{(2)}(i) = d^{(2)}(i)$ | $M_{symb}^{layer} = M_{symb}^{(0)} =$<br>$M_{symb}^{(1)} = M_{symb}^{(2)}$ |
| 4 | 4 | $x^{(0)}(i) = d^{(0)}(i)$<br>$x^{(1)}(i) = d^{(1)}(i)$<br>$x^{(2)}(i) = d^{(2)}(i)$<br>$x^{(3)}(i) = d^{(3)}(i)$ | $M_{symb}^{layer} = M_{symb}^{(0)} =$<br>$M_{symb}^{(1)} = M_{symb}^{(2)} = M_{symb}^{(3)}$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

In this way, it may be implemented that a CQI corresponding to each codeword may reflect only one layer, so that the CQI may reflect transmission of fewer layers. Therefore, in a condition of a same quantity of layers or a same rank, channel quality information may be indicated by more CQIs. Because data transmission is scheduled by the base station according to the CQI fed back by the user equipment, more CQI information may improve accuracy of scheduling, so that a modulation and coding scheme can be more accurately determined. On the other hand, more UE pairing may be implemented during MU-MIMO transmission, thereby enhancing a throughput of an entire system.

Figure 5:
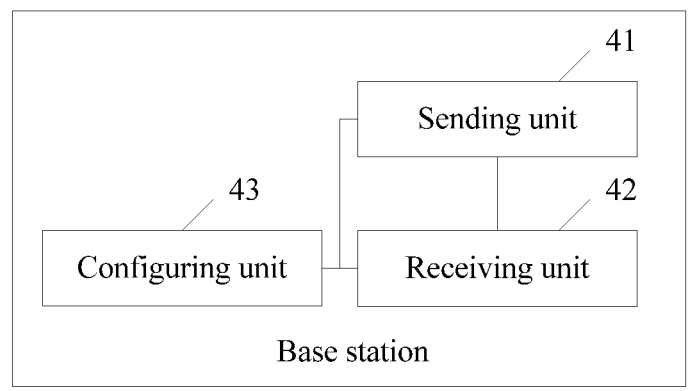
FIG. 5 is a schematic structural diagram of another base station according to an embodiment of the present invention.

Optionally, as shown in FIG. 5, the base station may further include a configuring unit 43.

The configuring unit 43 is configured to configure the first codeword-to-layer mapping or the second codeword-to-layer mapping for the user equipment by using signaling. That is, it may be implemented that the foregoing first codeword-to-layer mapping or second codeword-to-layer mapping is set by the base station. The first codeword-to-layer mapping or the second codeword-to-layer mapping may be specifically sent to the user equipment by using higher layer signaling such as RRC signaling, or dynamic signaling such as DCI.

In the foregoing technical solution, a base station sends a first reference signal set to user equipment, so that the user equipment can obtain, based on the first reference signal set and a first codeword-to-layer mapping, CSI that includes an RI and a CQI, and report the CSI, where the CQI included in the CSI is obtained based on the first codeword-to-layer mapping. The base station sends a second reference signal set to the user equipment, and sends data based on a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling may be improved, and in particular, precision of an MCS used during data transmission may be improved; and during implementation of MU-MIMO transmission, accuracy of CQI adjustment may be improved, and a pairing quantity of paired user equipment may be increased, thereby enhancing a throughput of a communications system.

Figure 6:
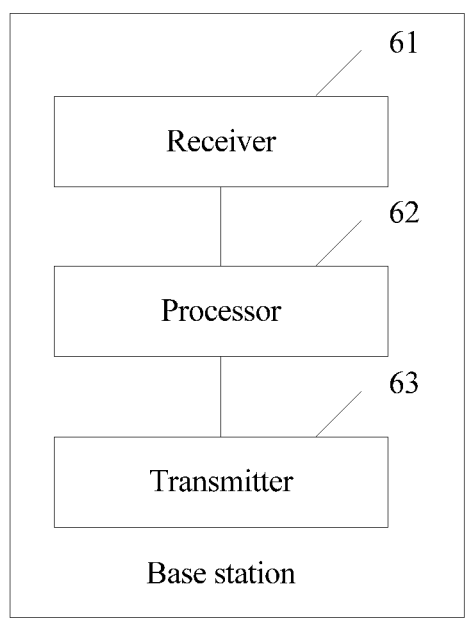
FIG. 6 is a schematic structural diagram of other user equipment according to an embodiment of the present invention.

Referring to FIG. 6, FIG. 6 is a schematic structural diagram of other user equipment according to an embodiment of the present invention. As shown in FIG. 6, the user equipment includes a receiver 61, a processor 62, and a transmitter 63.

The receiver 61 is configured to receive a first reference signal set sent by a base station.

The processor 62 is configured to obtain, based on the first reference signal set and a first codeword-to-layer mapping, channel state information CSI that includes a rank indicator RI and a channel quality indicator CQI, where the first codeword-to-layer mapping includes a first mapping between at least one codeword and at least one transport layer, and the transport layer is a transport layer between the base station and the user equipment.

The transmitter 63 is configured to send the CSI to the base station.

The receiver 61 is further configured to receive a second reference signal set sent by the base station.

The receiver 61 is further configured to receive, based on the second reference signal set and a second codeword-to-layer mapping, data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

Optionally, a quantity of layers used by the base station to send the data is less than or equal to a quantity of layers that is indicated by the RI, and a transmission manner (for example, a modulation and coding scheme) used by the base station to send the data is selected by the base station based on the CQI.

The first codeword-to-layer mapping may include at least one of the following:

mappings between three codewords and three layers, where one codeword is allowed to be mapped to only one layer; or mappings between four codewords and four layers, where one codeword is allowed to be mapped to only one layer.

In addition, the foregoing first codeword-to-layer mapping may include at least the following mappings:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$<br>$x^{(1)}(i) = d^{(1)}(i)$<br>$x^{(2)}(i) = d^{(2)}(i)$ | $M_{symb}^{layer} = M_{symb}^{(0)} =$<br>$M_{symb}^{(1)} = M_{symb}^{(2)}$ |
| 4 | 4 | $x^{(0)}(i) = d^{(0)}(i)$<br>$x^{(1)}(i) = d^{(1)}(i)$<br>$x^{(2)}(i) = d^{(2)}(i)$<br>$x^{(3)}(i) = d^{(3)}(i)$ | $M_{symb}^{layer} = M_{symb}^{(0)} =$<br>$M_{symb}^{(1)} = M_{symb}^{(2)} = M_{symb}^{(3)}$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

In this way, it may be implemented that a CQI corresponding to each codeword may reflect only one layer, so that the CQI may reflect transmission of fewer layers. Therefore, in a condition of a same quantity of layers or a same rank, channel quality information may be indicated by more CQIs. Because data transmission is scheduled by the base station according to the CQI fed back by the user equipment, more CQI information may improve accuracy of scheduling, so that a modulation and coding scheme can be more accurately determined. On the other hand, more UE pairing may be implemented during MU-MIMO transmission, thereby enhancing a throughput of an entire system.

Optionally, the first codeword-to-layer mapping or the second codeword-to-layer mapping may be configured by the base station by using signaling. That is, it may be implemented that the foregoing first codeword-to-layer mapping or second codeword-to-layer mapping is set by the base station. The user equipment may be specifically notified of the first codeword-to-layer mapping or the second codeword-to-layer mapping by using higher layer signaling such as radio resource control (RRC) signaling, or dynamic signaling such as DCI.

It should be noted that for implementation manners of the first codeword-to-layer mapping, obtaining the CQI, and receiving the foregoing data, refer to implementation manners in the embodiment shown in FIG. 1. Details are not repeatedly described herein.

In the foregoing technical solution, user equipment receives a first reference signal set sent by a base station, obtains, based on the first reference signal set and a first codeword-to-layer mapping, CSI that includes an RI and a CQI, and reports the CSI. When receiving data sent by the base station, the user equipment obtains the data based on a second reference signal set and a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling may be improved, and in particular, an MCS used during data transmission may be more accurately determined; and during implementation of MU-MIMO transmission, accuracy of CQI adjustment may be improved, and a pairing quantity of paired user equipment may be increased, thereby enhancing a system throughput.

Figure 7:
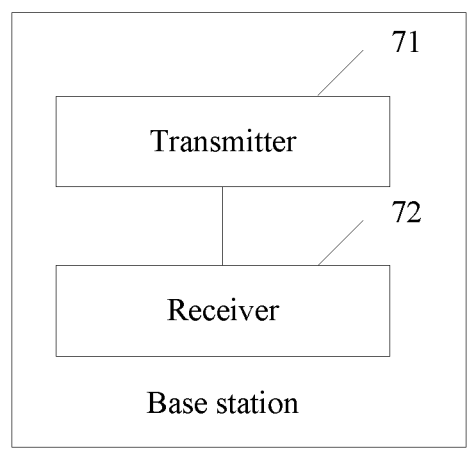
FIG. 7 is a schematic structural diagram of another base station according to an embodiment of the present invention.

Referring to FIG. 7, FIG. 7 is a schematic structural diagram of another base station according to an embodiment of the present invention. As shown in FIG. 7, the base station includes a transmitter 71 and a receiver 72.

The transmitter 71 is configured to send a first reference signal set to user equipment.

The receiver 72 is configured to receive channel state information CSI that includes a rank indicator RI and a channel quality indicator CQI and that is sent by the user equipment, where the CSI is obtained by the user equipment based on the first reference signal set and a first codeword-to-layer mapping, the first codeword-to-layer mapping includes a first mapping between at least one codeword and at least one transport layer, and the transport layer is a transport layer between the base station and the user equipment.

The transmitter 71 is further configured to send a second reference signal set to the user equipment.

The transmitter 71 is further configured to send data to the user equipment based on a second codeword-to-layer mapping, and send the data to the user equipment, so that the user equipment receives, based on the second reference signal set and the second codeword-to-layer mapping, the data sent by the base station, where a quantity of layers to which at least one codeword is mapped in the first codeword-to-layer mapping is less than a quantity of layers to which a codeword is mapped in the second codeword-to-layer mapping, and the first codeword-to-layer mapping includes a second mapping between at least one codeword and the at least one transport layer.

Optionally, a quantity of layers used for the foregoing sending the data may be less than or equal to a quantity of layers that is indicated by the RI, and a transmission manner (for example, a modulation and coding scheme) used to send the data may be selected based on the CQI.

Optionally, the first codeword-to-layer mapping may include at least one of the following:

mappings between three codewords and three layers, where one codeword is allowed to be mapped to only one layer; or mappings between four codewords and four layers, where one codeword is allowed to be mapped to only one layer.

For example, the foregoing first codeword-to-layer mapping may include at least the following mappings:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$ $x^{(1)}(i) = d^{(1)}(i)$ $x^{(2)}(i) = d^{(2)}(i)$ | $M_{symb}^{layer} = M_{symb}^{(0)} =$ $M_{symb}^{(1)} = M_{symb}^{(2)}$ |
| 4 | 4 | $x^{(0)}(i) = d^{(0)}(i)$ $x^{(1)}(i) = d^{(1)}(i)$ $x^{(2)}(i) = d^{(2)}(i)$ $x^{(3)}(i) = d^{(3)}(i)$ | $M_{symb}^{layer} = M_{symb}^{(0)} =$ $M_{symb}^{(1)} = M_{symb}^{(2)} = M_{symb}^{(3)}$ | where $N_{layer}$ indicates a quantity of layers, $N_{CW}$ indicates a quantity of codewords, $x^{(0)}(i)$, $x^{(1)}(i)$, $x^{(2)}(i)$, $x^{(3)}(i)$ are respectively symbols transmitted on the layers, $d^{(0)}(i)$, $d^{(1)}(i)$, $d^{(2)}(i)$, $d^{(3)}(i)$ are respectively symbols included in the codewords, and $M_{symb}^{(0)}$, $M_{symb}^{(1)}$, $M_{symb}^{(2)}$, $M_{symb}^{(3)}$ are respectively quantities of symbols transmitted on the layers.

In this way, it may be implemented that a CQI corresponding to each codeword may reflect only one layer, so that the CQI may reflect transmission of fewer layers. Therefore, in a condition of a same quantity of layers or a same rank, channel quality information may be indicated by more CQIs. Because data transmission is scheduled by the base station according to the CQI fed back by the user equipment, more CQI information and channel quality corresponding to each layer may be better described, so that the base station may obtain more accurate and specific channel quality information about the user equipment. Therefore, accuracy of scheduling may be improved, and in particular, a modulation and coding scheme may be more accurately determined. On the other hand, during implementation of MU-MIMO transmission, accuracy of CQI adjustment may be improved, and a pairing quantity of paired UE may be increased, thereby enhancing a throughput of an entire system.

Optionally, the transmitter 71 may be further configured to configure the first codeword-to-layer mapping for the user equipment by using signaling. That is, it may be implemented that the foregoing first codeword-to-layer mapping or second codeword-to-layer mapping is set by the base station. The first codeword-to-layer mapping or the second codeword-to-layer mapping may be specifically sent to the user equipment by using higher layer signaling such as RRC signaling, or dynamic signaling such as DCI.

It should be noted that for implementation manners of the first codeword-to-layer mapping, the CQI, and sending the foregoing data, refer to implementation manners in the embodiment shown in FIG. 2.

In the foregoing technical solution, a base station sends a first reference signal set to user equipment, so that the user equipment can obtain, based on the first reference signal set and a first codeword-to-layer mapping relationship, CSI that includes an RI and a CQI, and report the CSI, sends a second reference signal set to the user equipment, and sends data based on a second codeword-to-layer mapping. A quantity of layers to which at least one included codeword is mapped in the first codeword-to-layer mapping is less than a quantity of layers to which a codeword is mapped in the second codeword-to-layer mapping, and both a CQI and data are obtained in the prior art by using a same codeword-to-layer mapping. Therefore, a quantity of layers reflected by a CQI in the present invention is less, compared with that in the prior art. When the CQI reflects a less quantity of layers, channel quality corresponding to each layer may be better described, so that the base station may obtain more accurate and specific channel quality information about the user equipment. Therefore, accuracy of scheduling is improved, and in particular, precision of an MCS used during data transmission is improved; and during implementation of MU-MIMO transmission, accuracy of CQI adjustment may be improved, and a quantity of paired user equipment may be increased, thereby enhancing a system throughput.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing disclosed descriptions are merely exemplary embodiments of the present invention, but are not intended to limit the scope of the claims of the present invention. Therefore, equivalent variations made according to the claims of the present invention shall fall within the scope of the present invention.

What is claimed is:

1. A data transmission method, comprising:
receiving, by user equipment, a first reference signal set sent by a base station;
obtaining, by the user equipment based on the first reference signal set and a first codeword-to-layer mapping, channel state information (CSI) that comprises a rank indicator (RI) and a channel quality indicator (CQI), and sending the CSI to the base station, wherein the first codeword-to-layer mapping comprises a first mapping between at least one codeword and at least one transport layer, and the transport layer is a transport layer between the base station and the user equipment;
receiving, by the user equipment, a second reference signal set sent by the base station; and
receiving, by the user equipment based on the second reference signal set and a second codeword-to-layer mapping, data sent by the base station, wherein a quantity of layers to which at least one codeword is mapped in the first codeword-to-layer mapping is less than a quantity of layers to which a codeword is mapped in the second codeword-to-layer mapping, and the first codeword-to-layer mapping comprises a second mapping between at least one codeword and the at least one transport layer,
wherein the first codeword-to-layer mapping comprises mappings between three codewords and three layers, wherein one codeword is allowed to be mapped to only one layer, each codeword is successively mapped to a corresponding layer in sequence, an index value of a layer to which a codeword is mapped is equal to an index value of the codeword, and a sequence formed by index values of layers to which the codewords are mapped is a cyclic shift of a sequence formed by index values of the codewords.

2. The method according to claim 1, wherein the first codeword-to-layer mapping comprises the following mapping:

| Quantity of layers $N_{layer}$ | Quantity of codewords $N_{CW}$ | Codeword-to-layer mapping $i = 0, 1, \ldots, M_{symb}^{layer} - 1$ | |
|---|---|---|---|
| 3 | 3 | $x^{(0)}(i) = d^{(0)}(i)$ $x^{(1)}(i) = d^{(1)}(i)$ $x^{(2)}(i) = d^{(2)}(i)$ | $M_{symb}^{layer} = M_{symb}^{(0)} =$ $M_{symb}^{(1)} = M_{symb}^{(2)}$ | wherein $N_{layer}$ indicates a quantity of layers, $N_{CW}$ indicates a quantity of codewords, $x^{(0)}(i)$, $x^{(1)}(i)$, $x^{(2)}(i)$, are respectively symbols transmitted on the layers, $d^{(0)}(i)$, $d^{(1)}(i)$, $d^{(2)}(i)$, are respectively symbols comprised in the codewords, and $M_{symb}^{(0)}$, $M_{symb}^{(1)}$, $M_{symb}^{(2)}$, are respectively quantities of symbols transmitted on the layers.

3. The method according to claim 1, wherein the first codeword-to-layer mapping or the second codeword-to-layer mapping is configured by the base station by using signaling.

4. A data transmission method, comprising:
sending, by a base station, a first reference signal set to user equipment;
receiving, by the base station, channel state information (CSI) that comprises a rank indicator (RI) and a channel quality indicator (CQI) and that is sent by the user equipment, wherein the CSI is obtained by the user equipment based on the first reference signal set and a first codeword-to-layer mapping, the first codeword-to-layer mapping comprises a first mapping between at least one codeword and at least one transport layer, and the transport layer is a transport layer between the base station and the user equipment;
sending, by the base station, a second reference signal set to the user equipment; and
sending, by the base station, data to the user equipment based on a second codeword-to-layer mapping, so that the user equipment receives, based on the second reference signal set and the second codeword-to-layer mapping, the data sent by the base station, wherein a quantity of layers to which at least one codeword is mapped in the first codeword-to-layer mapping is less than a quantity of layers to which a codeword is mapped in the second codeword-to-layer mapping, and the first codeword-to-layer mapping comprises a second mapping between at least one codeword and the at least one transport layer, wherein the first codeword-to-layer mapping comprises mappings between three codewords and three layers, wherein one codeword is allowed to be mapped to only one layer, each codeword is successively mapped to a corresponding layer in sequence, an index value of a layer to which a codeword is mapped is equal to an index value of the codeword, and a sequence formed by index values of layers to which the codewords are mapped is a cyclic shift of a sequence formed by index values of the codewords.

5. The method according to claim 4, wherein the first codeword-to-layer mapping comprises the following mapping:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$ $\quad M_{symb}^{layer} = M_{symb}^{(0)} =$ $x^{(1)}(i) = d^{(1)}(i)$ $\quad M_{symb}^{(1)} = M_{symb}^{(2)}$ $x^{(2)}(i) = d^{(2)}(i)$ | wherein $N_{layer}$ indicates a quantity of layers, $N_{CW}$ indicates a quantity of codewords, $x^{(0)}(i)$, $x^{(1)}(i)$, $x^{(2)}(i)$, are respectively symbols transmitted on the layers, $d^{(0)}(i)$, $d^{(1)}(i)$, $d^{(2)}(i)$, are respectively symbols comprised in the codewords, and $M_{symb}^{(0)}$, $M_{symb}^{(1)}$, $M_{symb}^{(2)}$, are respectively quantities of symbols transmitted on the layers.

6. The method according to claim 4, wherein the method further comprises:

configuring, by the base station, the first codeword-to-layer mapping or the second codeword-to-layer mapping for the user equipment by using signaling.

7. User equipment, comprising a receiver, a processor, and a transmitter, wherein the receiver is configured to receive a first reference signal set sent by a base station;

the processor is configured to obtain, based on the first reference signal set and a first codeword-to-layer mapping, channel state information (CSI) that comprises a rank indicator (RI) and a channel quality indicator (CQI), wherein the first codeword-to-layer mapping comprises a first mapping between at least one codeword and at least one transport layer, and the transport layer is a transport layer between the base station and the user equipment;

the transmitter is configured to send the CSI to the base station;

the receiver is further configured to receive a second reference signal set sent by the base station; and the receiver is further configured to receive, based on the second reference signal set and a second codeword-to-layer mapping, data sent by the base station, wherein a quantity of layers to which at least one codeword is mapped in the first codeword-to-layer mapping is less than a quantity of layers to which a codeword is mapped in the second codeword-to-layer mapping, and the first codeword-to-layer mapping comprises a second mapping between at least one codeword and the at least one transport layer, wherein the first codeword-to-layer mapping comprises mappings between three codewords and three layers, wherein one codeword is allowed to be mapped to only one layer, each codeword is successively mapped to a corresponding layer in sequence, an index value of a layer to which a codeword is mapped is equal to an index value of the codeword, and a sequence formed by index values of layers to which the codewords are mapped is a cyclic shift of a sequence formed by index values of the codewords.

8. The user equipment according to claim 7, wherein the first codeword-to-layer mapping comprises the following mapping:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$ $\quad M_{symb}^{layer} = M_{symb}^{(0)} =$ $x^{(1)}(i) = d^{(1)}(i)$ $\quad M_{symb}^{(1)} = M_{symb}^{(2)}$ $x^{(2)}(i) = d^{(2)}(i)$ | wherein $N_{layer}$ indicates a quantity of layers, $N_{CW}$ indicates a quantity of codewords, $x^{(0)}(i)$, $x^{(1)}(i)$, $x^{(2)}(i)$, are respectively symbols transmitted on the layers, $d^{(0)}(i)$, $d^{(1)}(i)$, $d^{(2)}(i)$, are respectively symbols comprised in the codewords, and $M_{symb}^{(0)}$, $M_{symb}^{(1)}$, $M_{symb}^{(2)}$, are respectively quantities of symbols transmitted on the layers.

9. The user equipment according to claim 7, wherein the first codeword-to-layer mapping or the second codeword-to-layer mapping is configured by the base station by using signaling.

10. A base station, comprising a transmitter and a receiver, wherein the transmitter is configured to send a first reference signal set to user equipment;

the receiver is configured to receive channel state information (CSI) that comprises a rank indicator (RI) and a channel quality indicator (CQI) and that is sent by the user equipment, wherein the CSI is obtained by the user equipment based on the first reference signal set and a first codeword-to-layer mapping, the first codeword-to-layer mapping comprises a first mapping between at least one codeword and at least one transport layer, and the transport layer is a transport layer between the base station and the user equipment;

the transmitter is further configured to send a second reference signal set to the user equipment; and the transmitter is further configured to send data to the user equipment based on a second codeword-to-layer mapping, so that the user equipment receives, based on the second reference signal set and the second codeword-to-layer mapping, the data sent by the base station, wherein a quantity of layers to which at least one codeword is mapped in the first codeword-to-layer mapping is less than a quantity of layers to which a codeword is mapped in the second codeword-to-layer mapping, and the first codeword-to-layer mapping comprises a second mapping between at least one codeword and the at least one transport layer, wherein the first codeword-to-layer mapping comprises mappings between three codewords and three layers, wherein one codeword is allowed to be mapped to only one layer, each codeword is successively mapped to a corresponding layer in sequence, an index value of a layer to which a codeword is mapped is equal to an index value of the codeword, and a sequence formed by index values of layers to which the codewords are mapped is a cyclic shift of a sequence formed by index values of the codewords.

11. The base station according to claim 10, wherein the first codeword-to-layer mapping comprises the following mapping:

| Quantity of layers $N_{layer}$ | Quantity of codewords $N_{CW}$ | Codeword-to-layer mapping $i = 0, 1, \ldots, M_{symb}^{layer} - 1$ |
|---|---|---|
| 3 | 3 | $x^{(0)}(i) = d^{(0)}(i)$    $M_{symb}^{layer} = M_{symb}^{(0)} =$ |
|   |   | $x^{(1)}(i) = d^{(1)}(i)$    $M_{symb}^{(1)} = M_{symb}^{(2)}$ |
|   |   | $x^{(2)}(i) = d^{(2)}(i)$ | wherein $N_{layer}$ indicates a quantity of layers, $N_{CW}$ indicates a quantity of codewords, $x^{(0)}(i)$, $x^{(1)}(i)$, $x^{(2)}(i)$, are respectively symbols transmitted on the layers, $d^{(0)}(i)$, $d^{(1)}(i)$, $d^{(2)}(i)$, are respectively symbols comprised in the codewords, and $M_{symb}^{(0)}$, $M_{symb}^{(1)}$, $M_{symb}^{(2)}$, are respectively quantities of symbols transmitted on the layers.

12. The base station according to claim 10, wherein the transmitter is further configured to configure the first codeword-to-layer mapping or the second codeword-to-layer mapping for the user equipment by using signaling.

* * * * *